United States Patent Office 3,245,522
Patented Apr. 12, 1966

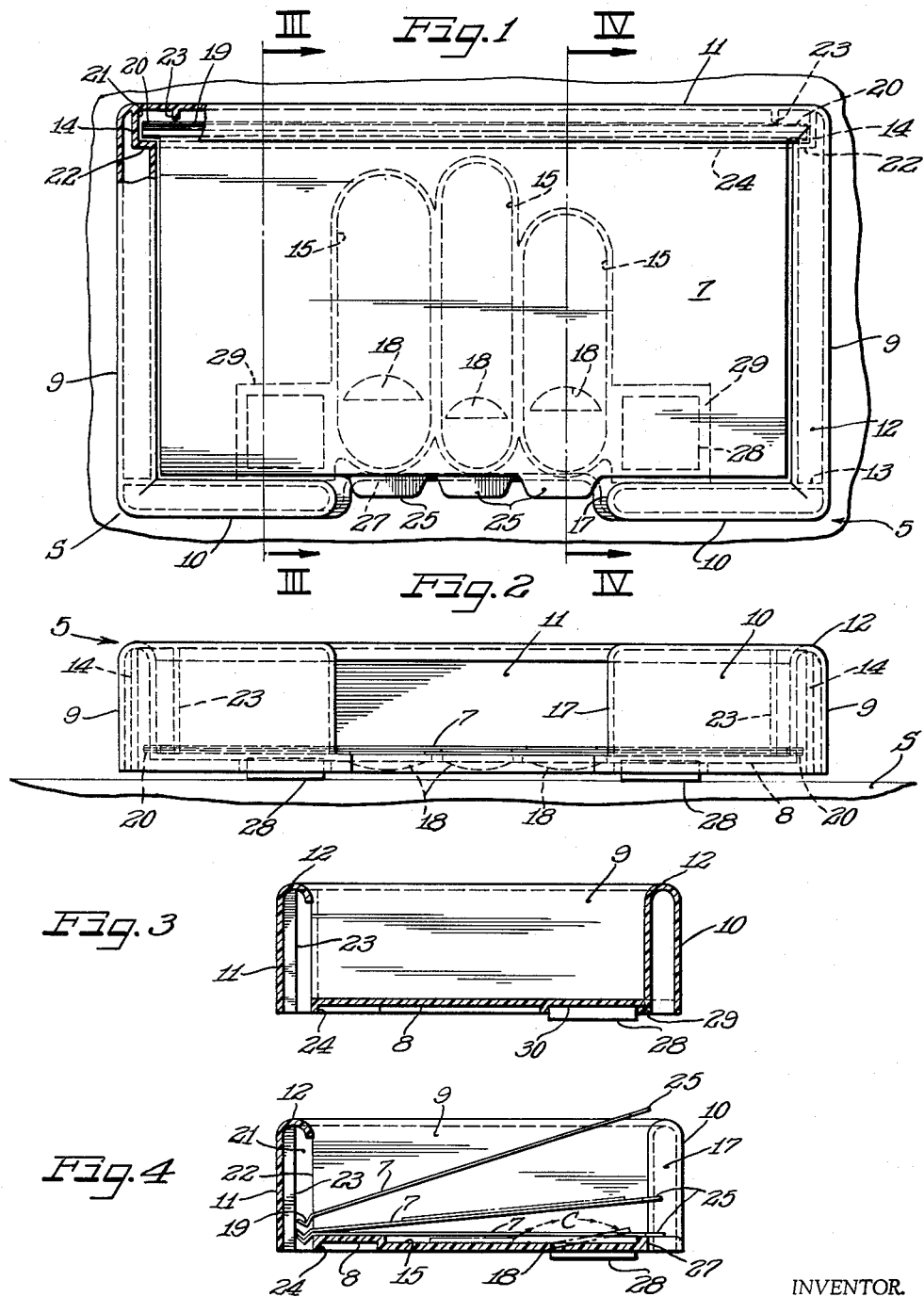

3,245,522
UTILITY TRAY
William S. Pearson, P.O. Box 4502, Baltimore, Md.
Filed May 8, 1963, Ser. No. 278,897
12 Claims. (Cl. 206—.81)

The present invention relates to a novel utility tray of the type useful for disposition in a handy location for filing small papers and for handy storage of small objects, and more particularly concerns a device of this character which is especially useful in or adjacent to the driver's compartment of an automotive vehicle.

In the course of operation of an automotive vehicle, various receipts, trading stamps, paper clips, cards and the like are desirably kept handy for the driver's use or reference or, as in the case of trading stamps permitted to accumulate for a period of time before being transferred to a different location. Placing such miscellaneous paper items in the usual glove compartment of the vehicle presents various problems, not the least of which is the virtual impossibility of keeping such a collection of small paper articles in any semblance of orderly fashion.

Another desirable accommodation is to have some means for keeping on hand readily available to the operator of the vehicle a supply of suitable coins for use in parking meters, paying tolls, etc.

An important object of the present invention is to provide a new and improved utility tray structure.

Another object of the invention is to provide a novel utility tray structure especially useful in association with the driver's compartment of an automotive vehicle.

A further object of the invention is to provide a novel utility tray structure of simple and rugged construction.

Still another object of the invention is to provide a novel utility tray structure which is adapted to be mounted conveniently on the usual shelf adjacent to the inside of the windshield of an automobile.

Yet another object of the invention is to provide a novel utility tray of the character described which is readily portable and shiftable but is self-sustaining on a magnetic surface.

A still further object of the invention is to provide a novel utility tray having an improved ararngement of retaining plates for holding articles in the tray.

A yet further object of the invention is to provide a new and improved multi-purpose utility tray especially useful for convenient filing and retaining of small paper articles as well as a supply of coins readily at hand adjacent to the driver of an automotive vehicle.

Other objects, features and advantages of the present invention will be readily apparent from the following detailed description of a preferred embodiment thereof, taken in conjunction with the accompany drawing, in which:

FIGURE 1 is a top plan view, partially broken away and in section of a utility tray embodying features of the invention;

FIGURE 2 is a front elevational view of the tray;

FIGURE 3 is a sectional detail view through the tray taken substantially on the line III—III of FIGURE 1; and FIGURE 4 is a sectional detail view through the tray taken substantially on the line IV—IV of FIGURE 1.

In a preferred construction, my tray is devised to be made as a monolithic body 5 which accommodates one or a plurality of movable holddown plates 7. While the tray body 5 and the movable leaves or plates 7 may be made from any suitable material, desirably the tray body is made from a readily moldable self-sustaining synthetic plastic material, and the plates 7 from thin sheet metal as die stampings.

A rugged, lightweight construction of the tray body 5 comprises a preferably essentially flat bottom wall 8 joined to hollow side walls 9, a hollow front wall 10 and a hollow rear wall 11. These walls comprise essentially inner and outer vertical parallel relatively thin wall panels joined at the top of the walls by a uniform, connected, rounded joining crown 12, while the walls all open downwardly, thus enabling ready withdrawal of forming die elements. For rigidity suitably located integral vertical reinforcing webs 13 are provided within the hollow walls such as at 13 adjacent to the front ends of the side walls 9 and 14 adjacent to opposite ends of the rear wall 11, and more particularly adjacent to and cooperating with the inside and outside vertical corner junctures of the walls. This affords a desirably substantially rigid upright retaining wall structure while the panels of the walls are as thin as practicable considering the material from which made, molding techniques employed, handling which must be resisted, and the like.

Along their lower edges, the upstanding wall panels are disposed in a common plane, with the bottom wall 8 at a sufficiently higher elevation, that is offset upwardly from such lower edges, to accommodate one or more, and in this instance three, side-by-side parallel front-to-rear downwardly inset elongated groove areas defining upwardly opening coin-receiving storage pockets or coin storage bed recesses 15. These grooves are dimensioned as best seen in FIG. 1, to accommodate a preferred range of coin denominations to lie in horizontal planes flat therein, in this instance, considered from right-to-left, pennies, dimes and nickels. In the illustrated example of the tray structure, the major dimension is from side-to-side, and the coin grooves 15 are grouped centrally with their front ends adjacent to but spaced slightly from the front edge of the bottom wall 8, and aligned with an access opening 17 in the front wall 10. In order to facilitate removal of respective coins C from the pocket grooves 15, each has adjacent to its front end and within the rear portion of a coin size perimeter a shallow ramp-like indentation 18 enabling the rear marginal portion of a coin C to be lifted from any slot to be tilted down as indicated in dash outline in FIGURE 4 so that the front edge of the coin is elevated to facilitate digital grasping of the coin to remove it from the groove or slot 15.

Each of the holddown leaves or panels or plates 7 is similarly constructed and adapted to be superimposed one upon another and freely relatively swingably, separably movable within the confines of the upright walls, and supported in collapsed or at rest position in superposed relation upon the bottom wall 8. Along their rear margins, the plates 7 have reinforcing and pivot or hinge means desirably comprising a narrow longitudinal depressed rib 19, complementary for internesting on the several plates and at each side of the respective plates extending into and the full length of an aligned trunnion extension 20. Thereby, as shown in FIG. 2, the plates 7 are adapted to lie flat on one another. These trunnions 20 are operatively received within respective vertical trunnion grooves 21 defined by the vertical reinforcing webs 14 at the opposite ends of the rear wall 11 and affording rearwardly facing vertical respective retaining shoulders 22 in front of the trunnions and along the rear edges of the inside panels of the side walls 9.

For freedom of swinging, lifting relative movement of the plates 7 all dimensions of the plates and the confining structure of the tray are in relatively loose fit relationship. This freedom of movement, but effectively retained association, is implemented by having the rear edges of the plates opposed by narrow vertical spacer ribs 23 comprising forwardly projecting reinforcement on the inner side of the rear wall panel of the rear wall 11 and affording vertical lines of limited contact adjacent to the opposite ends of the rear wall. Further, freedom of vertical separation movement of the plates is enabled by omission of an area of the inner panel of the rear wall 11 slightly wider than the width of the panels 7 and between the bottom wall 8 and the inner side of the crown 12, leaving only a narrow reinforcing flange portion 24 as reinforcement under the rear edge of the bottom wall. Through this arrangement, the panels 7 are adapted to be freely relatively hingedly moved or bodily vertically shifted, as indicated in FIG. 4. Also, assembly or removal of the panels 7 with respect to the tray 5 can readily be effected by sideward canted manipulation of the panels to maneuver the relatively short trunnions 20 in respect to the grooves 21.

For convenience in lifting the panels 7 selectively, they are provided along their front edges with respective lifting tabs 25 which are desirably located in staggered relation on the central portions of the plates, substantially as shown. To facilitate manipulation of the tabs 25, the bottom wall 8 generally in line with the access gap 17 in the front wall 10 is provided with an inset recess 27 affording a free space below the tabs 25.

Means are provided for conveniently attaching the tray assembly to a supporting surface such as on a shelf S such as that customarily provided in an automobile over the instrument panel and inside adjacent the windshield in the front or driver's compartment of an automobile. In a desirable arrangement, such means comprise one or more, herein shown as two, small flat magnets 28 mounted on the lower face of the bottom wall 8 and projecting slightly below the lower plane of the tray 5. Conveniently, these magnets 28 are gripped on their perimeters and retained within reinforcing and retaining rib flange means 29 formed for this purpose on the lower face of the bottom wall 8 and defining respective recesses 30 in which the magnets are mounted with their lower faces projecting slightly downwardly for engagement with the supporting shelf surface S which is usually of a magnetic material such as steel so that the magnets maintain a firm but releasable grip thereon for thereby holding the tray in position.

Another function of the magnets 28 is to hold the lowermost of the separator and holddown panel plates 7 releasably, in the nature of a magnetic latch, down against the upper face of the bottom wall 8 and thus in closing relation over the coin slot grooves 15 to avoid jostling displacement of coins therefrom. Since the bottom wall 8 is quite thin, the lower plate 7 is within the magnetic field of the magnets and where made from a magnetic material such as steel, good magnetic holddown attraction for such plate is afforded. Where the superposed plates 7 are also of a magnetic material they will also be normally held down but with less attraction than the lowermost of the plates and progressively less from bottom to top whereby to enable ready separation of the plates by mere lifting on the respective tabs 52 thereof. Of course, if it is desired to avoid magnetic attraction then such plates may be made from aluminum or plastic or other nonmagnetic material. It will be observed that in order to implement the plate holddown function of the magnets 28, they are located on the front portion of the bottom wall 8 and desirably in a balanced relation at each side of the access opening 17 and alongside the adjacent one of the respective coin slot grooves 15.

For car shelf utility, the tray 5 may be, for example, about seven or eight inches wide by about four or five inches deep and about one and one-half inches high. This affords ample accommodation for an array of small articles such as receipts, trading stamps, address notes, and the like which may be interleaved between the plates 7 which will hold such papers against blowing out of the tray and also separated, as desired. Since only a few of the holddown plates 7 are ordinarily needed, the arrangement disclosed affords substantial upward expansion room for accumulation of substantial material between the plates. Additionally, ample room is afforded for miscellaneous objects on top of the plates such as pen or pencil, small notebooks, smoker's articles and the like.

The availability of a supply of various small denomination coins is a great convenience for parking meter fees, road and bridge tolls, and the like, where small change is required. Where tokens are employed, as in certain bridge toll payments, the coin slot recess pockets 15 can be used to maintain a handy supply of such tokens.

It will be understood that modifications and variations may be effected without departing from the scope of the novel concepts of the present invention.

I claim as my invention:

1. A utility tray construction comprising, in combination,
   a tray body having a bottom wall and upstanding retaining walls,
   a plurality of superimposed holddown plates dimensioned to overlie the bottom wall within the upright walls, each of the plates having a complementary rear marginal indented reinforcing rib and respective oppositely projecting hinge trunnions aligned with and comprising extension of the ribs on each plate, said ribs and trunnions being internested to enable the plates to lie flat on one another,
   and vertical channel retaining guides on said upright walls with which said trunnions cooperate as hinges and to retain the plates against planar displacement relative to the tray body upon swinging the plates hingedly relative to the bottom wall about the respective rib and aligned trunnion axes.

2. A utility tray as defined in claim 1, wherein said plates have staggered tabs on a marginal portion thereof remote from said ribs, and the upright walls extend substantially entirely about said plates for retaining items interleaved between the plates against escape laterally from between the plates, but said walls having a clearance opening in the vicinity of said tabs to facilitate access thereto.

3. A utility tray construction including, in combination,
   a tray body having a bottom wall and upstanding retaining walls,
   a plurality of holddown plates superimposed upon said bottom wall within said retaining walls and individually and collectively movable relative to the bottom wall, at least the lowermost of the plates being of magnetic material,
   and magnet means carried by said lower wall and releasably restraining said lower plate against movement upwardly away from said bottom wall.

4. A utility tray construction including, in combination,
   a tray body having a bottom wall and upstanding retaining walls,
   a plurality of holddown plates superimposed upon said botton wall within said retaining walls and individually and collectively movable relative to the bottom wall, at least the lowermost of the plates being of magnetic material,
   magnet means carried by said lower wall and releasably restraining said lower plate against movement upwardly away from said bottom wall,
   and coin storage pocket means in the upper face of said bottom wall over which said lower plate is normally held by said magnet means as a closure.

5. A utility tray including a tray body having a bottom wall and retaining upright walls,
   a plate swingably mounted and normally lying on said bottom wall,
   the upper face of the bottom wall having coin pockets, said plate providing a cover for said pockets.

6. A utility tray including a tray body having a bottom wall and retaining upright walls, a plate swingably mounted and normally lying on said bottom wall, the upper face of the bottom wall having coin pockets, said plate providing a cover for said pockets, and releasable retaining means for said plate carried by said bottom wall.

7. A utility tray construction as defined in claim 6, wherein said retaining means comprise a magnet and said plate in at least the portion thereof adjacent to the magnet comprises magnetic material.

8. A utility tray including a tray body having a bottom wall and upright retaining walls providing an upward opening, at least one holddown plate for articles within the tray and adapted normally to lie upon said bottom wall within the retaining walls and being manipulatable for access under the plate, said plate having a magnetic portion, and magnetic retaining means carried by said lower wall for magnetically attracting said portion and retaining said plate against articles under the plate above said bottom wall.

9. A utility tray comprising a tray body having a bottom wall, said bottom wall having upwardly opening elongated side-by-side coin groove pockets, and a member removably supported upon said bottom wall and providing a cover over said pockets.

10. A utility tray construction comprising a bottom wall and monolithically connected upstanding retaining walls, said retaining walls being of hollow double panel structure with a crown on top and open downwardly, one of said upright walls comprising a rear wall and having a substantial opening in its inner panel, vertical reinforcing ribs on the inner face of the outer panel of said rear wall, and holddown plates supported upon said bottom wall within said retaining walls and having hinge margins extending through said opening and adapted to bear against said vertical reinforcing ribs.

11. A utility tray of the type useful for disposition in a handy location adjacent of the driver's compartment of an automotive vehicle for filing small papers and for handy storage of small objects and comprising in combination:

a tray body having a bottom wall having means for attaching the tray in place, upright retaining walls in substantially enclosing relation about said bottom wall and rising therefrom and including a front wall portion, at least one holddown plate dimensioned to fit within the upright walls and to overlie said bottom wall, said plate having a rear margin and having hinge trunnions extending from respectively opposite sides of said margin, vertical hinge guide means on said upright walls enabling pivotal swinging of the plate relative to said bottom wall and also enabling upward movement of the entire plate including the hinge means relative to the bottom wall as articles are deposited under the plate to be held down toward the bottom wall by the plate, a tab projecting from the front margin of the plate, said upright front wall having an access opening aligned with said tab, and said bottom wall having a clearance recess aligned with said opening and said tab to facilitate manipulative engagement of the tab.

12. A utility tray construction comprising a substantially flat bottom wall and monolithically connected upstanding retaining walls, said retaining walls being of hollow double panel structure including spaced apart inner and outer wall panels defining a hollow space therebetween and said bottom wall being integral with the inner panels and spaced above the lower edges of the panels, said inner panels having a lower narrow reinforcing flange portion extending downwardly from the bottom wall, all of said wall panels extending substantially coextensively upwardly from said lower edges, an integral crown joining the upper edges of the wall panels and closing the top of said hollow space, and integral reinforcing webs extending vertically within said hollow space coextensively with said wall panels and connecting said walls panels, said outer wall panels having lower edges spaced from said bottom wall and from said inner wall panels and thereby providing a downward opening from said hollow space.

References Cited by the Examiner
UNITED STATES PATENTS

| | | | |
|---|---|---|---|
| 425,768 | 4/1890 | Ezell | 248—361 |
| 475,685 | 5/1892 | Exline. | |
| 892,661 | 7/1908 | Gottschalk. | |
| 1,385,885 | 7/1921 | Norris | 206—0.8 |
| 1,438,181 | 12/1922 | Klopf | 206—45.14 |
| 1,749,376 | 3/1930 | De Lisle. | |
| 1,837,886 | 12/1931 | Schmidt. | |
| 2,051,131 | 8/1936 | Crow | 206—0.8 |
| 2,316,296 | 4/1943 | Simonds | 220—72 |
| 2,398,060 | 4/1946 | Van Alstyne | 248—361 |
| 2,574,983 | 11/1951 | Reed | 220—72 X |
| 2,593,762 | 4/1952 | Jones | 206—74 |
| 2,659,486 | 11/1953 | Krupin | 206—74 |
| 2,787,397 | 4/1957 | Rodford | 220—72 X |
| 2,802,588 | 8/1957 | Reynolds | 220—68 X |
| 2,825,447 | 3/1958 | Kurland | 220—19.5 |
| 2,931,489 | 4/1960 | Farnholtz | 206—19.5 |

THERON E. CONDON, *Primary Examiner.*

GEORGE O. RALSTON, *Examiner.*